Patented Aug. 1, 1950

2,516,955

UNITED STATES PATENT OFFICE 2,516,955

PLASTICIZED POLYMERS

John Mann Butler and Charles H. Rector, Jr., Dayton, Ohio, assignors to Monsanto Chemical Company, St. Louis, Mo., a corporation of Delaware No Drawing. Application February 27, 1948, Serial No. 11,852

5 Claims. (Cl. 260—31.8)

This invention relates to new compositions useful as plasticizers in vinyl resin compositions. More particularly the invention relates to the modified vinyl resins made by the incorporation of particular new plasticizers.

The primary purpose of this invention is to provide a new type of plasticizer imparting improved low volatility characteristics and good heat stability to polyvinyl resins, and particularly to polymers of vinyl chloride. A further purpose of this invention is to provide means of preparing the new plasticizers. A still further purpose of the invention is to prepare new and improved vinyl chloride polymer compositions.

It has been found that chloracetic acid may be reacted with hydroquinone to form p-phenylenedioxydiacetic acid which has the structural formula:

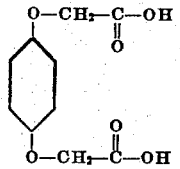

This acid may be esterified by inter-reaction with a suitable monohydric alcohol, preferably in the presence of an esterification catalyst, such as sulfuric acid, p-toluene sulfonic acid and phosphoric acid. Although any monohydric alcohol may be used to esterify the acid, of particular utility as plasticizers are the esters of alcohols having 6 to 12 carbon atoms, such as ethylhexyl alcohol, methylheptyl alcohol, trimethylhexanol, isooctanol, n-hexanol, dodecyl alcohol, methyloctyl, and other alcohols, particularly those with branch chains, and mixtures of said alcohols obtained by the reaction of hydrogen and carbonmonoxide with olefinic hydrocarbons derived from petroleum.

The new esters are valuable plasticizers for polyvinyl chloride and copolymers of more than 70 percent vinyl chloride and up to 30 percent other polymerizable monomers compatible therewith, for example vinyl acetate and other vinyl esters of monocarboxylic acids, ethyl maleate, ethyl fumarate, and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized, and upon its molecular weight it is generally found that from 5 to 50 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the migration of the plasticizer during use.

Further details of the practice of this invention are set forth with respect to the following specific examples.

Example 1

A 500 ml., 3-necked flask was fitted with a rotary stirring mechanism and a reflux condenser provided with a suitable water trap. The flask was charged with 114 grams of p-phenylenedioxydiacetic acid prepared by the reaction of hydroquinone and chloracetic acid, 143 grams of 2-ethylhexyl alcohol, 29 grams of toluene and 1.1 grams of para-toluene sulfonic acid. After refluxing for eight hours it was washed with sodium bicarbonate solution and dried in the presence of anhydrous calcium chloride. The solvent, unreacted alcohol and volatile impurities were removed by heating the esters to a temperature of 175° C. at a pressure of 2 mm.

The ester so prepared (40 parts by weight) was milled with 59 parts of polyvinyl chloride on a heated roll mill until homogeneous. The polymer compositions were tested to determine the extent of volatilization when subjected to standard treatments using conventional plasticizers, as a control. It was found that the 2-ethylhexyl esters of p-phenylenedioxydiacetic acid was volatile to the extent of 0.9 percent, whereas 2-ethylhexyl phthalate was volatile to the extent of 3.8 percent. Compositions made under identical conditions from other plasticizers had even higher volatility. For example, the compound plasticized with dibutylcellosolve phthalate lost 5.35 percent of the plasticizer and the composition prepared from 2-ethylhexyl diphenyl phosphate lost 7.5 percent by weight of its plasticizer. The low volatility of this plasticizer could not have been predicted from vapor pressure and molecular weight considerations.

Although the invention has been described with respect to specific embodiments, it is not intended that the details thereof, shall be construed as limitations upon the scope of the invention except to the extent incorporated in the following claims.

We claim:

1. A plasticized vinyl resin composition which comprises a vinyl chloride polymer containing intimately dispersed therein an ester of p-phenylenedioxydiacetic acid and an alkyl alcohol having from 6 to 12 carbon atoms.

2. A vinyl resin composition which comprises a vinyl chloride polymer having intimately dispersed therein from five to 50 percent di-2-ethylhexyl p-phenylenedioxyacetate.

3. A vinyl resin composition which comprises a vinyl chloride polymer having intimately dispersed therein from five to 50 percent the diester of p-phenylenedioxydiacetic acid and isooctanol.

4. A vinyl resin composition which comprises a vinyl chloride polymer having intimately dispersed therein from five to 50 percent the diester of p-phenylenedioxydiacetic acid and trimethylhexanol.

5. A vinyl resin composition which comprises a vinyl chloride polymer having intimately dispersed therein the diesters of p-phenylenedioxydiacetic acid and mixed alcohols having 6 to 12 carbon atoms.

JOHN MANN BUTLER.
CHARLES H. RECTOR, Jr.

REFERENCES CITED

The following references are of record in the file of this patent:

UNITED STATES PATENTS

| Number | Name | Date |
|---|---|---|
| 2,109,947 | North | Mar. 1, 1938 |

OTHER REFERENCES

Journal of the Chemical Society, London, article by Carter et al., vol. LXXVII, pages 1227–1900.